United States Patent
Mulvanny et al.

[19]

[11] Patent Number: 5,497,271
[45] Date of Patent: Mar. 5, 1996

[54] HEAD UP DISPLAYS FOR MOTOR VEHICLES

[75] Inventors: Paul Mulvanny, Braunston; Malcolm Williams, Crescent, both of United Kingdom

[73] Assignee: Jaguar Cars Limited, Allesley, England

[21] Appl. No.: 285,022

[22] Filed: Aug. 2, 1994

[30] Foreign Application Priority Data

Sep. 7, 1993 [GB] United Kingdom ............ 9318520

[51] Int. Cl.⁶ ............ G02B 27/14; G09G 5/00
[52] U.S. Cl. ............ 359/631; 359/630; 359/634; 345/7
[58] Field of Search ............ 359/630, 631, 359/13, 632, 633, 838; 345/7, 9; 348/115

[56] References Cited

U.S. PATENT DOCUMENTS

| | | | |
|---|---|---|---|
| 3,603,929 | 9/1971 | Drysdale | 359/630 |
| 3,885,095 | 5/1975 | Wolfson | 359/630 |
| 3,915,548 | 10/1975 | Opittek | 359/15 |
| 4,697,879 | 10/1987 | Gerbe | 345/7 |
| 4,737,001 | 4/1988 | Moss | 359/34 |
| 4,987,410 | 1/1995 | Berman | 340/705 |
| 5,037,182 | 8/1991 | Groves | 359/630 |
| 5,129,309 | 7/1992 | Lecuyer | 89/41.06 |
| 5,140,465 | 8/1992 | Yasui | 359/631 |

FOREIGN PATENT DOCUMENTS

| | | |
|---|---|---|
| 0326323 | 8/1989 | European Pat. Off. . |
| 0420196 | 4/1991 | European Pat. Off. . |
| 2847590 | 5/1980 | Germany . |
| 9201038 | 4/1992 | Germany . |
| 58-080616 | 5/1983 | Japan . |
| 1409743 | 10/1975 | United Kingdom . |
| 8706017 | 10/1987 | WIPO . |

OTHER PUBLICATIONS

Chip, No. 6, Jun. 1990, Wurzburg, Germany, pp. 20–24, XP125797.
Rainer Grabowski 'Head–up display, Bilder und texte schweben wie eine Fata Morgana im Raum erzeugt von Head–up Displays, dijetzt Einzug in die Alltagswelt halten. Es liegt was in der lugt', p. 23, paragraph 2–paragraph 3 and p. 24, col. 3, paragraph 2.

*Primary Examiner*—Georgia Y. Epps
*Assistant Examiner*—Ricky Mock
*Attorney, Agent, or Firm*—Davis, Bujold & Streck

[57] ABSTRACT

A head up display system for a motor vehicle includes a sensor, display means for forming a video image from the signals received from the sensor and a projection system for projecting the video image onto the windscreen of the vehicle, the projection system including a mirror for deflecting the optical path of the projected image, said mirror being located directly in front of a driver of the vehicle at a level outside the normal field of view of the driver through the windscreen, the mirror being arranged; in a head up display mode, to direct the projected image onto the windscreen; and in a non-head up display mode, to permit direct viewing of the video image at a level outside the normal field of view of the driver through the windscreen.

14 Claims, 2 Drawing Sheets

HEAD UP DISPLAYS FOR MOTOR VEHICLES

BACKGROUND TO THE INVENTION

The present invention relates to head up displays for motor vehicles.

It has been proposed to provide a head up display for a motor vehicle in which an enhanced view of the road ahead is projected onto the vehicle windscreen, so that it is overlaid onto the drivers view of the scene. In this manner, potential hazards which may not be clearly visible to the driver, may be highlighted.

In order to ensure that the objects within the image appear to the driver to be the same size as the objects in the real scene, the field of view of the sensor is matched to the field of view which the driver has of the display. The image is then projected into the relevant area of the driver's forward line of sight and is arranged such that the driver's own view of the objects is overlaid with the images of the objects generated from the sensor, processing and display combinations.

To produce an overlaid image of this type, a large field of view is required. Within the constraints of the motor vehicle which places limitations on the size of the video display device which may be used and the optical path length of the projected image, this may be achieved by the use of a mirror which will bend the optical path. This will also allow the display device to be positioned behind the dashboard of a vehicle, the mirror serving to deflect the projected image onto the windscreen.

The centre line of the projected image and the centre line of the driver's forward field of view must also be coincident. As a result, the mirror used to deflect the projected image onto the windscreen must be positioned directly in front of the driver at a level below the level of the windscreen. That is, in a position conventionally used for the vehicle instrument display. The positioning of a mirror in this way will consequently significantly reduce the area available for vehicle instrument display.

SUMMARY OF THE INVENTION

According to one aspect of the present invention a head up display system for a motor vehicle comprises sensor means, means for forming a video image from the signals received from the sensor means and means for projecting the video image onto the windscreen of the vehicle, said means for projecting the video image including a mirror for deflecting the optical path of the projected image, said mirror being located directly in front of the driver at a level outside the normal field of view of the driver through the windscreen; the mirror being adapted, in a head up display mode, to permit projection of the image onto the windscreen; and, in a non-head up display mode, to permit viewing of the projected image at a level outside the normal field of view of the driver through the windscreen.

In accordance with the above described invention, when in the head up display mode the system will project the projected image onto the windscreen. However, in a non-head up display mode, the means for forming a video image may be used to provide a flexible format display which may form part of the conventional instrument display of the vehicle. This flexible format display may be used, for example, to display operating parameters of the vehicle, navigational information and/or views to the rear or sides of the vehicle for manoeuvring purposes.

Preferably the mirror reflects the projected image onto the windscreen in the head up display mode and permits passage of the projected image so that it may be viewed directly in the non-head up display mode. The mirror is furthermore preferably located at a level below that of the windscreen.

According to one embodiment of the invention, the mirror is a narrow band reflector, so that only light in a narrow waveband is reflected onto the windscreen. This form of mirror may be used with a light source emitting light within the narrow band, when in the head up display mode and a second light source emitting light outside the narrow band when in the non-head up display mode. However, preferably wide band light source is used in both modes, shutter means being provided to intercept the reflected light when in the non-head up display mode.

Alternatively, the mirror may be switchable electronically, by for example the use of electrochromic coatings or solutions; or may be movable mechanically between a position in which it is disposed in the path of the projected image and reflects the image onto the windscreen; and a position in which it is clear of the path of the projected image. Such systems may be used to project full colour or limited waveband images onto the windscreen.

BRIEF DESCRIPTION OF THE DRAWINGS

An embodiment of the invention is now described, by way of example only, with reference to the accompanying drawings in which.

DESCRIPTION OF A PREFERRED EMBODIMENT

Figure 1:
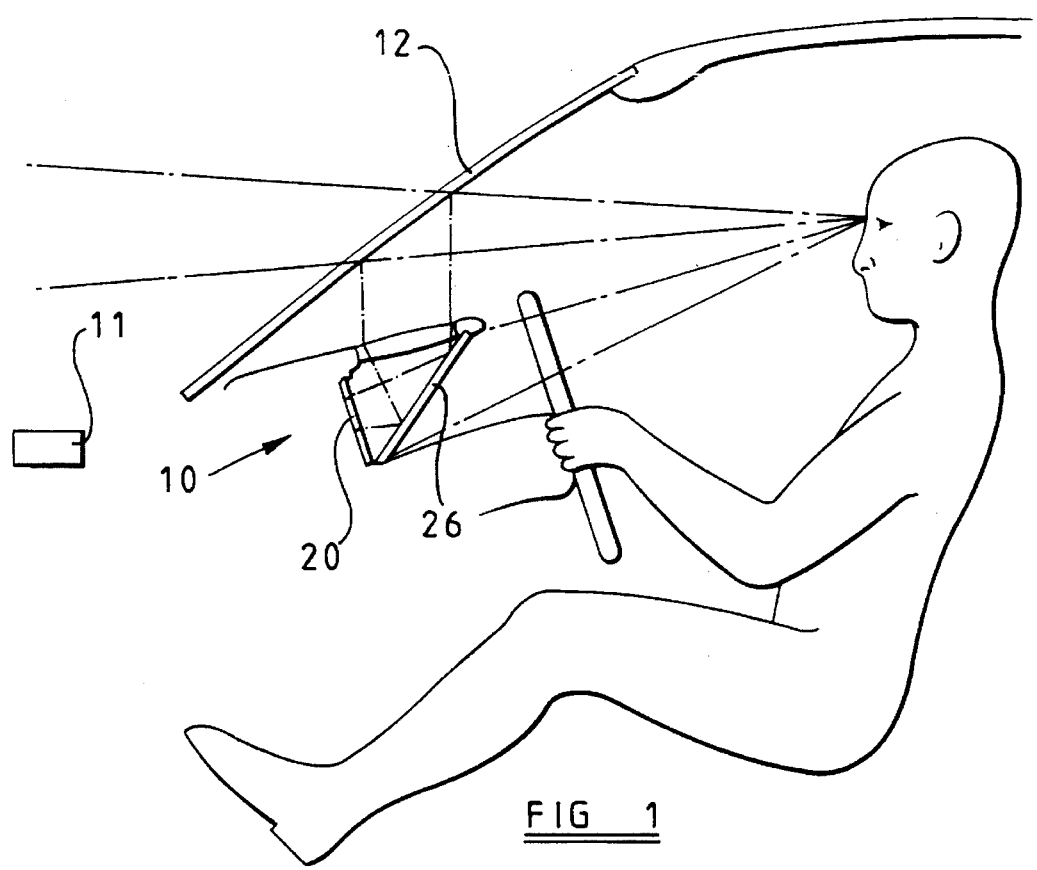
FIG. 1 is a partial sectional elevation of a motor vehicle with head-up display in accordance with the present invention.

As illustrated in FIG. 1, the head up display system 10 of the present invention projects an image onto the windscreen 12 of the vehicle, which coincides with the driver's view of the scene ahead of the vehicle. The head up display is arranged such that images produced by the head up display system are overlaid onto the objects viewed directly by the driver.

Figure 2:
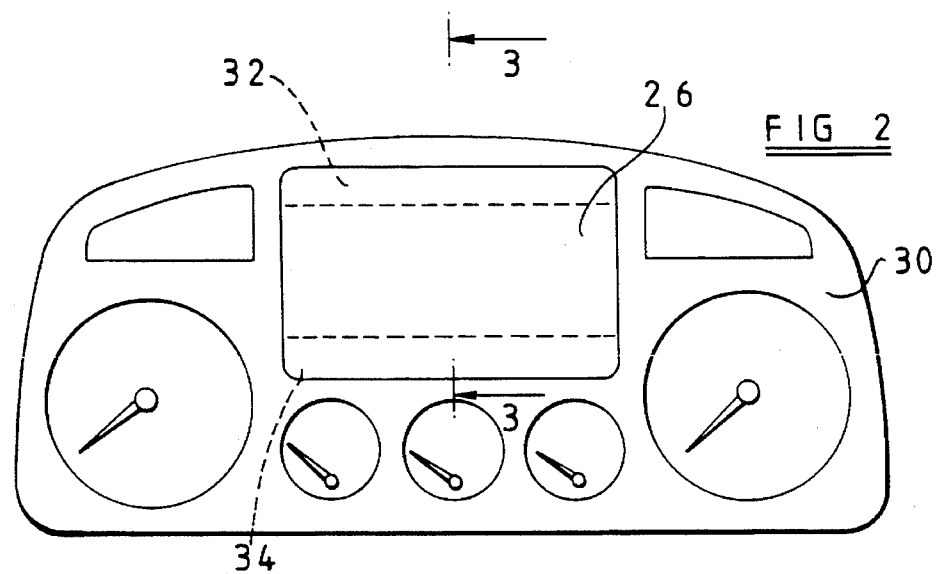
FIG. 2 is a plan view of an instrument panel of a vehicle fitted with a head-up display in accordance with the present invention.
Figure 3:
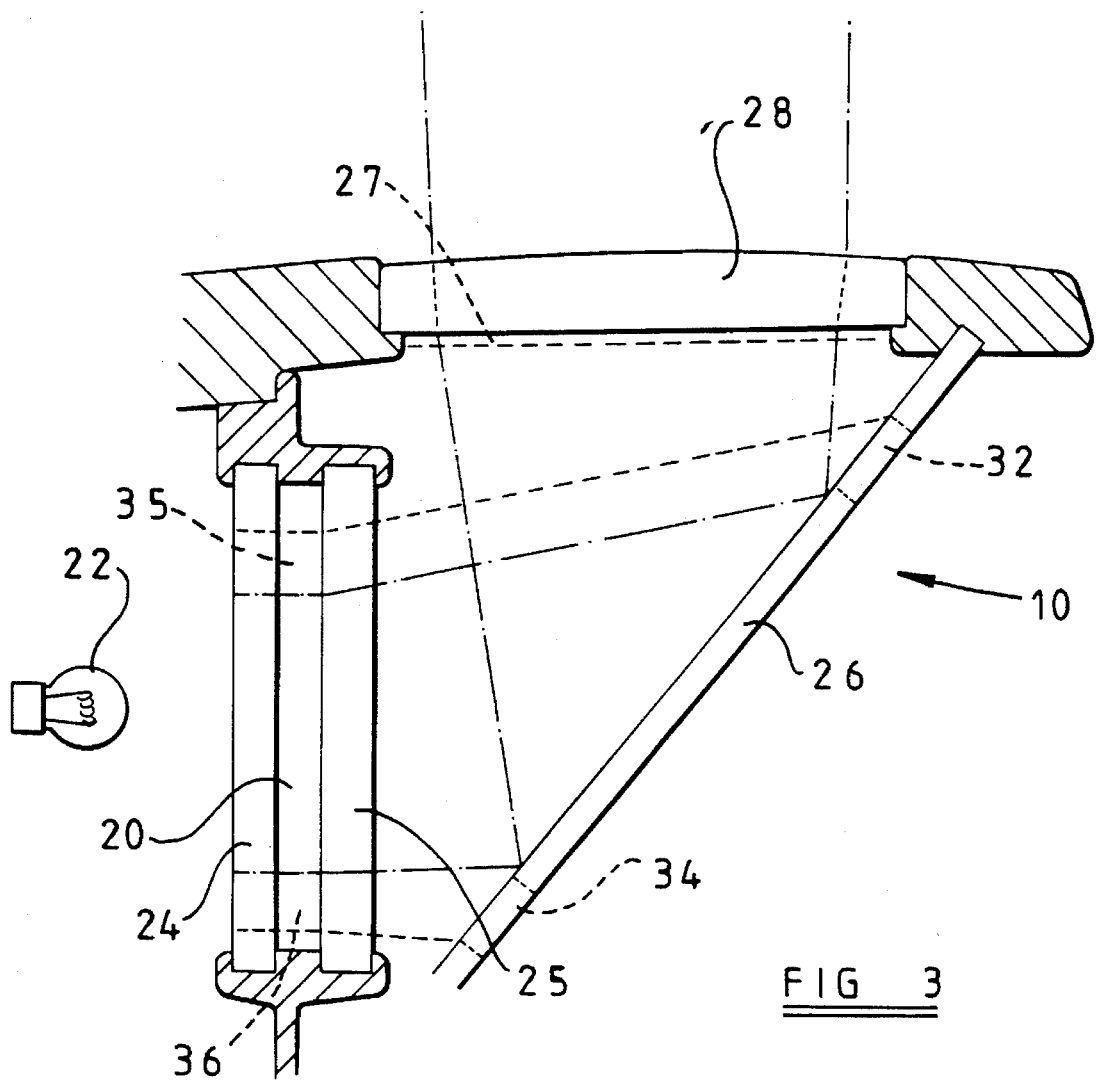
FIG. 3 is a sectional elevation of the head-up display system used in the vehicle illustrated in FIG. 1.

As illustrated in greater detail in FIGS. 2 and 3, the head up display system 10 includes a mirror 26 which reflects a projected image onto the windscreen 12. The mirror 26 is adapted to permit the passage of a projected image when the head up display system is not on, to provide a flexible format display which may be viewed in a head down display mode.

As illustrated in FIGS. 2 and 3, the head up display system 10 comprises a liquid crystal display 20 which converts signals from a sensor 11 which looks forwardly of the vehicle, into a video image. The sensor may operate in the infra-red, visible and/or ultra-violet wavelengths and the signals therefrom are processed to enhance the image.

The liquid crystal display 20 is illuminated by a wide band light source 22 and a lens system 24, 25 projects the video image produced by the liquid crystal display 20 onto a narrow waveband mirror 26, which is located centrally of the vehicle instrument panel 30 as illustrated in FIG. 2. The mirror 26 reflects light within the narrow waveband upwardly through an exit lens 28 and onto the windscreen 12. Light of wavelength outside the narrow waveband of mirror 26 is transmitted through the mirror 26 to provide a flexible format display which may be viewed on the reverse side of the mirror 26.

In the head up display mode of operation, the video image produced by the liquid crystal display 20 is reflected onto the windscreen 12 by mirror 26, so that it may be viewed by the driver. A display of reduced colour range of the image is also transmitted through the mirror 26 and may be viewed by the driver in a head down display mode.

When the head up display is switched off, a shutter 27 is placed over the exit lens 28, so that no image is projected onto the windscreen 12. The shutter 27 also prevents reflections from the optical system of the head up display system which would otherwise be reflected onto the windscreen 12. The shutter 27 may, for example, be a layer or solution of electrochromic material controlled electronically, or may be a mechanically controlled shutter.

When the shutter 27 is closed, the liquid crystal display 20 may be used in a flexible format display mode, to provide a reduced colour range display on the reverse side of the mirror 26 which may be viewed in a head down display mode. This flexible format display may be used to display vehicle parameters and symbols, navigational information or other similar data.

In the embodiment illustrated above, only the central part of the mirror 26 need be used for head up display purposes. The top and bottom regions 32 and 34 may for example be arranged to transmit light over the full visible spectrum and the corresponding regions 35, 36 of the liquid crystal display 20 may give a permanent display of vehicle parameters or symbols which will be displayed in the full colour range, on the reverse side of the mirror 26, whether the head up display is functional or not. Such information may be in the form of an array of warning lights corresponding to various parameters of the vehicle.

The liquid crystal display 20 may furthermore be used to superimpose warning messages on the windscreen when in the head up display mode. Such messages should not however unduly distract the drivers attention from the road. This mode of operation of the system may be used, for example, to give warning of failure of vital systems of the vehicle, collision avoidance information or indications for turning the vehicle generated by navigational systems.

Various modifications may be made without departing from the invention. For example, while in the above embodiment the video image is produced by a liquid crystal display, other display devices which will create an image which may be projected for example, cathode ray tubes, ferromagnetic displays or plasma displays, may be used. Furthermore, in place of a narrow waveband mirror, an electronically controlled electrochromic mirror or mechanically moved mirror may be used.

We claim:

1. A head up display system for a motor vehicle comprising:

sensor means for determining objects ahead of the vehicle;

means for forming a video image of the objects ahead of the vehicle from the signals received from the sensor means, said means producing a first video image of light wavelengths within a first band of wavelengths and for generating a second video image of light of wavelengths outside the first band of wavelengths;

means for projecting the first and second video images onto a selectively reflective mirror, said mirror being located between the video image generating means and a driver of the vehicle and directly in front of the driver at a level outside the normal field of view of the driver through the vehicle windscreen, the mirror reflecting light of wavelengths within said first band of wavelengths and transmitting light of wavelengths outside said first band of wavelengths;

the mirror reflecting the first video image of the objects ahead of the vehicle onto the vehicle windscreen where it is viewable by the driver of the vehicle, in a head up display mode; and the second video image being transmitted through the mirror where it is viewable directly by the driver of the vehicle in a head down display mode.

2. A head up display system according to claim 1 in which the image of the objects ahead of the vehicle, projected onto the windscreen overlays the actual objects as viewed by the driver of the vehicle.

3. A head up display system according to claim 1 in which the mirror is located at a level below the level of the windscreen.

4. A head up display system according to claim 1 in which the means for projecting the video image includes a light source of wavelengths greater than the first band of wavelengths, light of wavelengths corresponding to the first band of wavelengths being reflected onto the windscreen while light of wavelengths outside that of the first band of wavelengths being transmitted through the mirror.

5. A head up display system according to claim 4 in which shutter means is provided, to be located between the mirror and windscreen to intercept the projected image, when the head up display is switched off.

6. A head up display system according to claim 5 in which the shutter is provided by an electronically controlled electrochromic layer or solution.

7. A head up display system according to claim 5 in which a mechanical shutter is moved into the path of the projected image when the head up display system is switched off.

8. A head up display system according to claim 1 in which, in the head up display system mode, the projected image is produced by a light source of wavelength within said first band of wavelengths.

9. A head up display system according to claim 1 in which the means for generating a second video image may be used to produce display, to be viewed at a level outside the normal field of view of the driver through the windscreen, in the head down display mode.

10. A head up display system according to claim 9 in which the display provides a display of vehicle parameters and symbols, navigational information and/or views to the rear or sides of the vehicle for manoeuvring purposes.

11. A head up display system according to claim 1 in which the device for forming a video image is one of a liquid crystal display, cathode ray tube, ferromagnetic display and plasma display.

12. A head up display system according to claim 1 in which the mirror is arranged to permit passage of a portion of the projected image whether the head up display system is functional or not, the means for forming the video image being used to produce a permanent flexible format display corresponding to said portion of the projected image.

13. A head up display system according to claim 9 in which the flexible format display provides a display of vehicle parameters and symbols, navigational information and/or views to the rear or sides of the vehicle for manoeuvering purposes.

14. A head up display system according to claim 1 in which the means for forming a video image is arranged to superimpose warning messages on the windscreen, when the system is in the head up display mode.

\* \* \* \* \*